US008095956B1

(12) United States Patent
Brodigan et al.

(10) Patent No.: US 8,095,956 B1
(45) Date of Patent: Jan. 10, 2012

(54) METHOD AND SYSTEM FOR PROVIDING INTERACTIVE PROGRAMMING

(75) Inventors: Donald L. Brodigan, Broomfield, CO (US); Tom T. Thompson, Morrison, CO (US)

(73) Assignee: Qwest Communications International Inc, Denver, CO (US)

(*) Notice: Subject to any disclaimer, the term of this patent is extended or adjusted under 35 U.S.C. 154(b) by 1570 days.

(21) Appl. No.: 09/514,033

(22) Filed: Feb. 25, 2000

(51) Int. Cl.
H04N 7/173 (2011.01)
H04N 5/46 (2006.01)

(52) U.S. Cl. ........... 725/116; 725/93; 725/104; 709/219

(58) Field of Classification Search ............ 725/87–129, 725/144, 148, 136–138; 709/217–232
See application file for complete search history.

(56) References Cited

U.S. PATENT DOCUMENTS

| | | | | |
|---|---|---|---|---|
| 5,539,822 A * | 7/1996 | Lett | ............................. | 380/211 |
| 5,583,920 A * | 12/1996 | Wheeler, Jr. | ................... | 379/88 |
| 5,608,447 A * | 3/1997 | Farry et al. | ........................ | 348/7 |
| 5,742,677 A * | 4/1998 | Pinder et al. | ................... | 380/242 |
| 6,138,163 A * | 10/2000 | Nam et al. | .................... | 709/231 |
| 6,154,772 A * | 11/2000 | Dunn et al. | .................... | 709/217 |
| 6,184,878 B1 * | 2/2001 | Alonso et al. | ................. | 725/109 |
| 6,195,364 B1 * | 2/2001 | Brodigan | ...................... | 370/463 |
| 6,201,536 B1 * | 3/2001 | Hendricks et al. | ............ | 715/716 |
| 6,219,042 B1 * | 4/2001 | Anderson et al. | ............ | 715/716 |
| 6,249,526 B1 * | 6/2001 | Loukianov | .................... | 370/442 |
| 6,285,685 B1 * | 9/2001 | Bum | ............................ | 370/474 |
| 6,295,057 B1 * | 9/2001 | Rosin et al. | ................... | 715/744 |
| 6,308,328 B1 * | 10/2001 | Bowcutt et al. | ............... | 725/111 |
| 6,338,094 B1 * | 1/2002 | Scott et al. | .................... | 709/245 |
| 6,418,169 B1 * | 7/2002 | Datari | ..................... | 725/240.28 |
| 6,424,714 B1 * | 7/2002 | Wasilewski et al. | ......... | 380/200 |
| 6,442,158 B1 * | 8/2002 | Beser | ........................... | 370/352 |
| 6,510,519 B2 * | 1/2003 | Wasilewski et al. | ......... | 713/168 |
| 6,553,568 B1 * | 4/2003 | Fijolek et al. | ................ | 725/111 |
| 6,557,031 B1 * | 4/2003 | Mimura et al. | .............. | 709/218 |
| 6,675,386 B1 * | 1/2004 | Hendricks et al. | ........... | 725/105 |
| 6,678,733 B1 * | 1/2004 | Brown et al. | ................. | 709/229 |
| 6,804,825 B1 * | 10/2004 | White et al. | .................... | 725/87 |
| 6,928,656 B1 * | 8/2005 | Addington | ................... | 725/111 |
| 2001/0049720 A1 * | 12/2001 | Eyer | ............................ | 709/203 |

* cited by examiner

Primary Examiner — Annan Shang

(57) ABSTRACT

A method for providing interactive programming over a broadband network. A service provider provides a private data packet including the provider's address that is inserted between frames of a transmission that is broadcast over the broadband network. The interactive video/data system may include a broadcast source, a broadband digital terminal, and a set top box for a consumer's television receiver. A data path may be enabled by the set top box upon receipt of the private data packet included with the video transmission. The private data packet includes application interface information communicated in real-time between the set top box and broadcast source in addition to the destination address.

11 Claims, 2 Drawing Sheets

METHOD AND SYSTEM FOR PROVIDING INTERACTIVE PROGRAMMING

TECHNICAL FIELD

The present invention relates to bi-directional transmission of data over a broadband network in real-time.

BACKGROUND ART

Cable television systems have been developed to broadcast video programming over broadband networks. Cable television systems normally provide one-way transmission of video programming. Web TV™ has recently been developed to provide limited interactive television programming. However, viewers must utilize a phone line to interact with Internet service providers. With Web TV™, transmissions to Internet service providers are currently generally limited to text only transmission.

A need exists to provide real-time interactive video/data transmission capability without the limitation of requiring a phone line. It is desirable to be able to allow for delivery of specified video content to designated users that can be responded to on a real-time and interactive basis. Such a system would be ideal for providing interactive educational programs, interactive advertising with the ability to take orders for products immediately, conducting surveys of population groups and otherwise gathering market data. Market data could be collected with or without active viewer participation. The market data collected can be stored or correlated with other demographic data. It is desirable to provide two way communication without the need to involve a telephone network or any other separate facilities for video and data transmissions.

For the foregoing reasons, there is a need for an improved video and data communication system that overcomes the problems and limitations of the prior art.

DISCLOSURE OF INVENTION

Is an object of the invention to provide real-time, interactive video/data capability utilizing a bi-directional broadband network.

Is another object to the invention to provide for delivery of specified video content to designated users that can be immediately responded to in a bi-directional manner in real-time on an interactive basis. The interactive programming could allow, for example, interactive educational programs, interactive advertising, interactive surveys and the ability to gather market data with or without viewer participation.

According to a method of the present invention, personalized interactive programming is provided over a data path extending between a service provider and a set top box. The service provider is connected to a data network and has an address. The method includes establishing a communication path between a broadband digital terminal and a set top box. The broadband digital terminal is connected to the data network. A private data packet is sent from the service provider over the network to the set top box. The private data packet contains application interface information and the service provider address. An impulse pay-per-view communication link is established between the set top and the service provider based upon the address contained in the private data packet to allow interactive programming between the service provider and the set top box.

A system of the present invention comprises an interactive video/data system for interacting with a destination address on a network. A broadcast source at the destination address transmits a private data packet over a private virtual channel on the network, the data packet contains application interface information and the destination address. A broadband digital terminal receives the data packet over the private virtual channel. A set top box receives the packet from the broadband digital terminal and cooperates with the broadband digital terminal and the broadcast source to establish an impulse pay-per-view data path extending from the set top box to the broadband digital terminal, and over the network to the broadcast source at the destination address. The data path allows application interface information to be communicated in real-time between the set top box and the broadcast source.

The system may utilize optical network units between the broadband digital terminal and the network interfaces and associated set top boxes. Further, the network and communication paths may take many forms, but an impulse pay-per-view asynchronous transfer mode private virtual channel IPPV ATM PVC is preferred. The system preferably inserts the private data packets between frames of a video transmission on the broadband network. The video/data service provider may get programming from a variety of sources, including a local server or an Internet service provider.

The above objects and other objects, features and advantages of the present invention are readily apparent from the following detailed description of the best mode for carrying out the invention when taken in connection with the accompanying drawings.

BEST MODE FOR CARRYING OUT THE INVENTION

Figure 1:
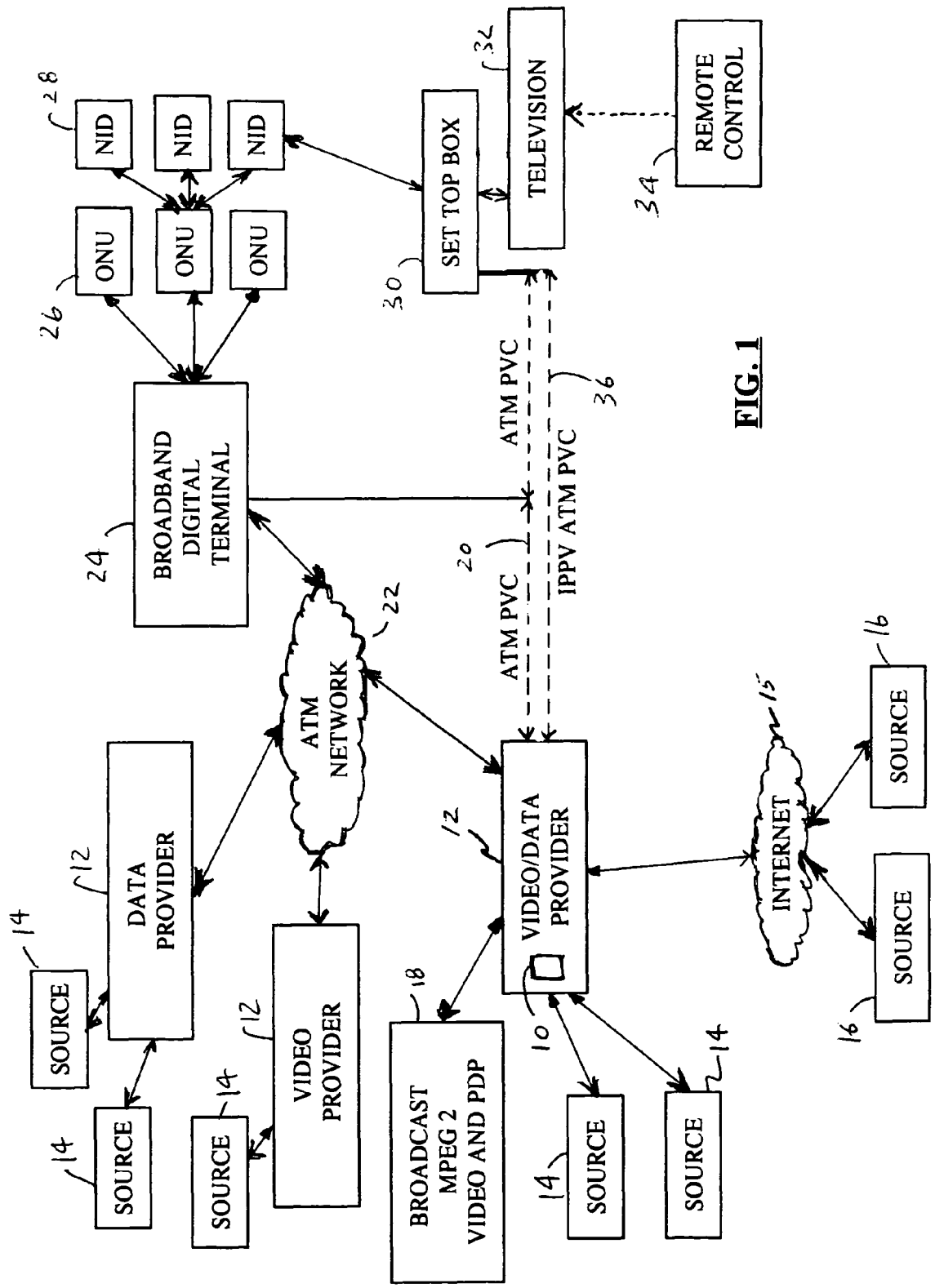
FIG. 1 is diagram illustrating an interactive video/data system and method for providing personalized interactive programming in accordance with the present invention.

A broadcast system is shown. The broadcast system may, for example, broadcast MPEG 2 (motion picture experts group) video format. The MPEG 2 broadcast of the present invention includes a private data packet (PDP). The PDP is preferably inserted between frames of the MPEG 2 video broadcast. Of course, other video formats may be used in the alternative. The PDP contains application programming interface (API) information and the destination video (or data depending on the implementation) host address, which may be implemented as an Internet protocol (IP) address. Of course, it is appreciated that the TCP/IP family of protocols are suitable for embodiments of the present invention, but other protocols may be used in the alternative. In embodiments of the present invention, API information sent from the MPEG 2 source allows user interaction at the set top box (STB), while the video host destination address provides a two-way communication path. As such, instead of simply receiving streaming MPEG 2 video at the STB, an impulse pay-per-view (IPPV) data path connects the STB to the host address, allowing API information to be sent in both directions to enable personalized programming.

A video/data service provider 12 has a head end 10 receiving programming from any number of sources 14, 16. For example, a local broadcast server 14 or Internet service provider 16 (ISP) on Internet 15 that desires exposure and the ability to engage in bidirectional communication with subscribers to the broadband network may send a private data packet (PDP) transmission to the head end 10 as shown at exemplary MPEG2 source 18. The video (or data) information from a source may be on a prerecorded storage medium or may be provided real-time.

In responding to the PDP, the STB identity is returned to the broadcast source. For example, a service provider 12 may be an educational institution that is seeking students for a remote learning program. The educational institution can provide a private data packet for inclusion in the MPEG 2 transmission of the broadcast at the head end 10. The private data packet can be represented in conjunction with the MPEG 2 video transmission as a screen overlay button. The MPEG 2 video in this instance would be an informative commercial regarding the educational program. In addition to receiving the video transmission, the customer would be provided with a menu button or other interactive device that contains the application interface information and the service provider address.

A primary data path 20 defined by the broadband network passes over an asynchronous transfer mode (ATM) network 22 and receives the broadcast from the head end 10. A broadband digital terminal (BDT) 24 receives the video (or data, or video and data) broadcast from the ATM edge switch. Then, depending upon the particular network distribution system used by the broadband network, the signal can then be transferred to an optical network unit (ONU) 26 and then to a network interface device (NID) 28. The optical network unit 26 and NID 28 may be included in the network or may be obviated by establishment of a direct network linkage to a consumer's set top box (STB) 30. If an optical network unit 26 and NID 28 are included in the network, the STB 30 would receive transmissions from the NID 28. The STB 30 is normally located adjacent the television 32 and provides video and data to the television 32. A remote control 34 is generally provided for communication to the STB 30 and television 32.

When and MPEG 2/PDP transmission is received by the STB 30, the STB will enable the application interface information in the PDP and establish a two-way real-time path between the STB 30 and the service provider 12 because the PDP contains the provider host address. The link between the STB 30 and service provider 12 is referred to as an impulse pay-per-view (IPPV) data path 36. The IPPV data path 36 is shown as a bidirectional dashed line in the drawing extending through the STB 30, the NID 28, the optical network unit 26, the BDT 24 and the ATM network 22, and finally to the service provider 12. The IPPV path, in the preferred embodiment, is composed of an ATM PVC connecting the provider to the BDT, and another PVC from the BDT to the STB, as shown in dashed line.

In operation, in the context of the educational remote learning example given above, the educational institution provides the PDP in conjunction with an MPEG 2 transmission that is transmitted to the user as described above. Upon viewing the MPEG 2 video and the PDP interactive mechanism on a television, a consumer may operate their remote control device to indicate an interest in engaging in real-time interactive communication with the service provider 12. This indication is communicated through the IPPV data path 36 that allows for bidirectional communication between the user via the remote control device and to the service provider 12. Upon receiving an indication that the user desires to communicate with the service provider, a service provider may respond through the bidirectional IPPV data path 36 with broadcast through the STB 30.

Interactive advertising can also be provided wherein a consumer can be directed by a PDP provided by an advertiser to communicate directly with the service provider 12 to allow for immediate and direct order entry utilizing the same broadband network connection that is used to provide the advertising video to the consumer. In like manner, consumers can be polled by a polling agency providing the PDP and allowing for direct response, to poll questions via the IPPV data path 36. In a slightly different mode, market data can be gathered or viewing patterns can be determined, with or without viewer participation, if the STB 30 is provided with a private data packet that retransmits through the IPPV data path 36 information regarding the receipt by the STB 30 of a particular MPEG 2/PDP transmission. The broadcaster at the head end 10 can also request market data information by providing queries that may be simply answered by the viewer indicating answers to the operation of the remote control device that is interpreted by the STB 30. Further, retransmitted PDPs from the STB may be used to measure the audience of, for example, an advertisement. As such, an advertiser may known exactly how many viewers received an advertisement instead of having to rely on television ratings generated by a sample of viewers using special set top boxes. That is, an advertiser may count the actual hits of an advertisement by counting retransmitted PDPs from ad receiving STBs.

Figure 2:
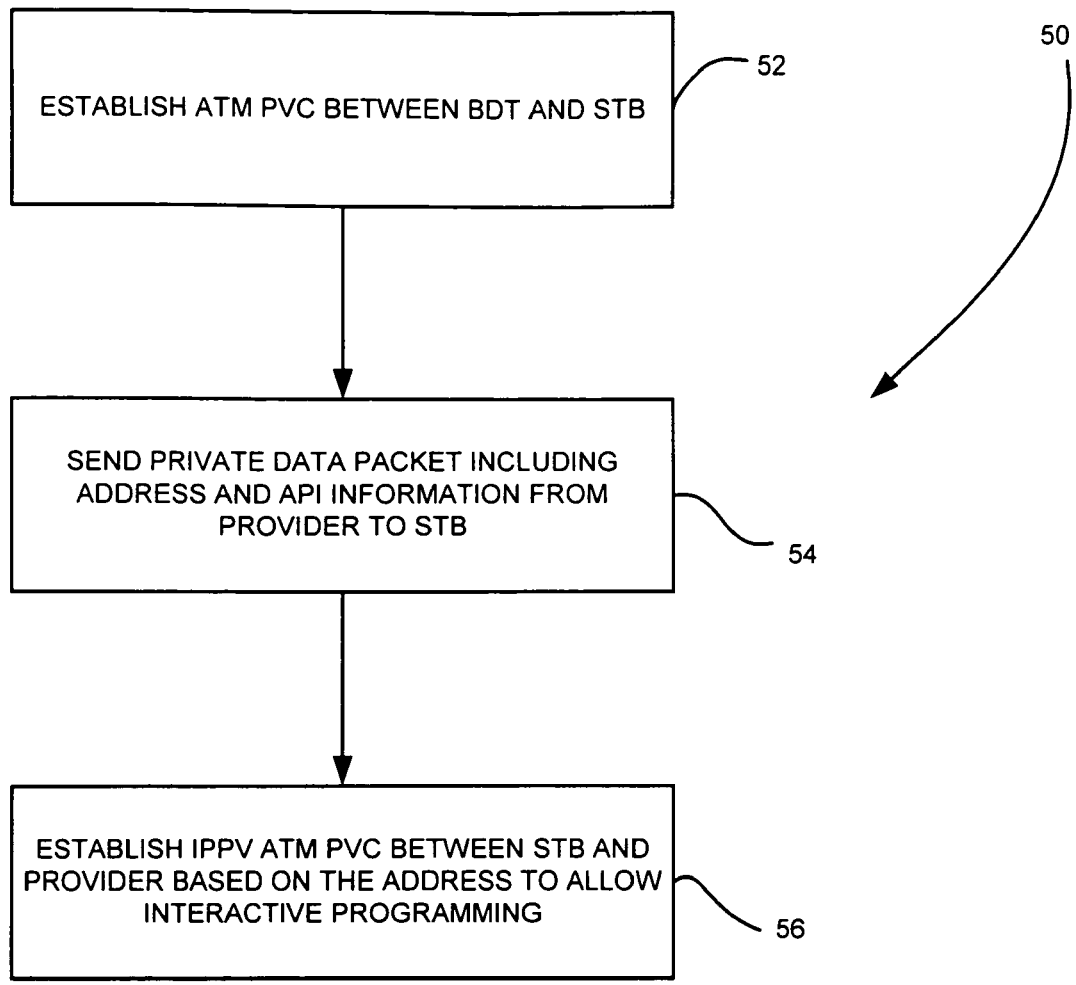
FIG. 2 is a block diagram illustrating a method of the present invention.

With reference to FIG. 2, a method of the present invention is generally indicated at 50. At block 52, an asynchronous transfer mode (ATM) private virtual channel (PVC) is established between the broadband digital terminal (BDT) and the set top box (STB). The ATM PVC allows the BDT to control what information is sent to the various set top boxes in the neighborhood. There are many advantages to broadcasting, for example, video programming over an ATM PVC. For example, only programming that the end consumer subscribes to is present at the set top box, preventing a non-paying subscriber from tampering with the set top box to receive information that is not subscribed to.

At block 54, a private data packet (PDP), including the video/data host address and application programming interface (API) information is sent from the video/data provider to the STB. By receiving the provider address, the STB operates to establish an impulse pay-for-view (IPPV) private virtual channel between the set top box and the provider. The IPPV allows interactive programming between the STB and the provider. Advantageously, embodiments of the present invention, for the very first time, personalize the data sent on a private virtual channel between the provider and the BDT for the particular subscriber at the set top box. Further, embodiments of the present invention utilize an impulse pay-for-view private virtual channel so that a subscriber at a set top box may communicate with the provider, with these communications passing through the broadband digital terminal (BDT) and over a network, such as an ATM network, to reach the provider. The use of private data packets from the provider brings the interactivity of programming to a new level, not achieved by any known systems.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for providing personalized interactive programming over a data path, the data path extending between a service provider and a set top box, the service provider being connected to a data network and having an address, the method comprising:

establishing a communication path between a broadband digital terminal and the set top box, the broadband digital terminal being connected to the data network and the service provider broadcasting video through the broadband digital terminal to the set top box;

sending a private data packet in addition to the broadcast video from the service provider, over the network and through the broadband digital terminal to the set top box, the packet containing application interface information for the service provider and containing the service provider address; and establishing an impulse pay-per-view communication path from the set top box through the broadband digital terminal and over the network to the service provider based upon the address to allow interactive programming using the application interface information between the service provider and the set top box to personalize the broadcast programming.

2. The method for providing personalized interactive programming over a data path of claim 1 wherein sending the private data packet is performed by inserting the private data packet between frames of a video transmission.

3. The method for providing personalized interactive programming over a data path of claim 2 wherein the video transmission is prerecorded programming that is transmitted on demand.

4. The method for providing personalized interactive programming over a data path of claim 2 wherein the video transmission is real-time programming.

5. An interactive video/data system for interacting with a destination address on a network, the system comprising:

a broadcast source at the destination address for transmitting a private data packet over a private virtual channel on the network, the packet containing application interface information and the destination address;

a broadband digital terminal receiving the packet over the private virtual channel from the broadcast source; and a set top box receiving the packet from the broadband digital terminal, and cooperating with the broadband digital terminal and the broadcast source to establish an impulse pay-per-view data path extending from the set top box to the broadband digital terminal, and over the private virtual channel to the broadcast source at the destination address, the data path allowing application interface information to be communicated in real-time between the set top box and the broadcast source.

6. The interactive video/data system of claim 5 further comprising a television receiving video transmissions from the set top box.

7. The interactive video/data system of claim 5 further comprising an optical network unit between the broadband digital terminal and the set top box.

8. The interactive video/data system of claim 7 further comprising a network interface device between the optical network unit and the set top box.

9. The interactive video/data system of claim 5 wherein the private data packet is inserted between frames of a video transmission.

10. The interactive video/data system of claim 5 wherein the broadcasting source is a local server.

11. The interactive video/data system of claim 5 wherein the broadcasting source is an Internet service provider.

* * * * *